(12) United States Patent
Wu et al.

(10) Patent No.: US 11,256,149 B2
(45) Date of Patent: Feb. 22, 2022

(54) DISPLAY PANEL AND DISPLAY APPARATUS

(71) Applicant: XIAMEN TIANMA MICRO-ELECTRONICS CO., LTD., Xiamen (CN)

(72) Inventors: Shumao Wu, Xiamen (CN); Huimin Xie, Xiamen (CN); Xin Dong, Xiamen (CN); Huangyao Wu, Xiamen (CN); Xiufeng Zhou, Xiamen (CN)

(73) Assignee: XIAMEN TIANMA MICRO-ELECTRONICS CO., LTD., Xiamen (CN)

( * ) Notice: Subject to any disclaimer, the term of this patent is extended or adjusted under 35 U.S.C. 154(b) by 0 days.

(21) Appl. No.: 16/453,367

(22) Filed: Jun. 26, 2019

(65) Prior Publication Data
US 2020/0209672 A1 Jul. 2, 2020

(30) Foreign Application Priority Data
Dec. 26, 2018 (CN) .......................... 201811601546.7

(51) Int. Cl.
*G02F 1/1345* (2006.01)
*G02F 1/1333* (2006.01)

(52) U.S. Cl.
CPC ...... *G02F 1/13452* (2013.01); *G02F 1/13458* (2013.01); *G02F 1/133308* (2013.01)

(58) Field of Classification Search
CPC ............. G02F 1/13452; G02F 1/13454; G02F 1/13458
See application file for complete search history.

(56) References Cited

U.S. PATENT DOCUMENTS

| | | | | |
|---|---|---|---|---|
| 6,172,732 | B1* | 1/2001 | Hayakawa | G02F 1/1345 349/152 |
| 6,683,669 | B1* | 1/2004 | Fujikawa | G02F 1/1345 349/149 |
| 8,102,349 | B2* | 1/2012 | Ashizawa | G02F 1/1345 345/92 |
| 9,974,175 | B2* | 5/2018 | Bae | G02F 1/13458 |
| 2003/0123013 | A1 | 7/2003 | Han et al. | |

FOREIGN PATENT DOCUMENTS

| | | |
|---|---|---|
| CN | 101359142 B | 11/2010 |
| CN | 105720028 A | 6/2016 |
| KR | 20150022211 A | 3/2015 |

\* cited by examiner

*Primary Examiner* — Dung T Nguyen
(74) *Attorney, Agent, or Firm* — Anova Law Group, PLLC

(57) ABSTRACT

A display panel and a display apparatus are provided. The display panel includes: a first edge and a second edge configured along a first direction and facing opposite to each other; a third edge and a fourth edge configured along a second direction and facing opposite to each other; a display area; and a non-display area surrounding the display area and including a binding area disposed adjacent to the first edge. The binding area includes a first sub-area adjacent to the third edge and a second sub-area adjacent to the fourth edge. Each of the first and second sub-areas includes a plurality of binding soldering pads arranged along the second direction. Each of the plurality of binding soldering pads includes a first section, a second section, and a third section.

20 Claims, 13 Drawing Sheets

DISPLAY PANEL AND DISPLAY APPARATUS

CROSS-REFERENCES TO RELATED APPLICATIONS

This application claims the priority of Chinese Patent Application No. 201811601546.7, filed on Dec. 26, 2018, the entire content of which is incorporated herein by reference.

FIELD OF THE DISCLOSURE

The present disclosure generally relates to the field of display technology and, more particularly, relates to a display panel and a display apparatus.

BACKGROUND

With the development of display technology, display apparatuses have become indispensable part of people's daily life. Bezels of display apparatuses are becoming narrower and narrower, and screen ratios of display apparatuses are becoming higher and higher, in order to achieve a full screen display effect.

Through shrinking widths of the bezels of a display apparatus, an active area (AA) of the display apparatus may be further expanded. The requirement for narrower bezels poses a challenge to the design and manufacture of display apparatuses.

In the design of a display apparatus, integrated circuits (ICs) may be configured in a display panel. In the existing technology, a chip-on-film (COF) technology is often used to reduce bezel areas occupied by the integrated circuits. The integrated circuits are often mounted on a flexible circuit board that is bound to the display panel. Thus, the display panel does not need to provide space for mounting the integrated circuits, and the area occupied by the bottom of the bezel may be reduced.

However, in the display apparatuses manufactured by using COF technology, misalignments between flexible circuit boards and display panels often occur, thereby failing the electrical connections between the flexible circuit boards and the display panels and reducing the reliability of the display apparatuses. Thus, a technical solution to improve the COF technology to produce more reliable display panels and display apparatuses is needed urgently.

The disclosed display panel and display apparatus are directed to solve one or more problems set forth above and other problems.

BRIEF SUMMARY OF THE DISCLOSURE

One aspect of the present disclosure provides a display panel. The display panel includes: a first edge and a second edge, configured along a first direction and facing opposite to each other; a third edge and a fourth edge, configured along a second direction and facing opposite to each other; a display area; and a non-display area surrounding the display area and including a binding area disposed adjacent to the first edge. The binding area includes a first sub-area adjacent to the third edge and a second sub-area adjacent to the fourth edge, each of the first and second sub-areas including a plurality of binding soldering pads arranged along the second direction. Each of the plurality of binding soldering pads includes a first section forming an angle $\alpha 1$ with respect to the first direction, a second section forming an angle $\alpha 2$ with respect to the first direction, and a third section disposed adjacent to the first edge and forming an angle $\alpha 3$ with respect to the first direction, where $0° \leq \alpha 1 < \alpha 2 < 90°$ and $0° \leq \alpha 3 < \alpha 2 < 90°$. The second section includes a first end connected to the first section and a second end connected to the third section. In the first sub-area, the second end of the second section is closer to the third edge than the first end of the second section. In the second sub-area, the second end of the second section is closer to the fourth edge than the first end of the second section.

Another aspect of the present disclosure provides a display apparatus. The display apparatus includes a display panel. The display panel includes: a first edge and a second edge, configured along a first direction and facing opposite to each other; a third edge and a fourth edge, configured along a second direction and facing opposite to each other; a display area; and a non-display area surrounding the display area and including a binding area disposed adjacent to the first edge. The binding area includes a first sub-area adjacent to the third edge and a second sub-area adjacent to the fourth edge, each of the first and second sub-areas including a plurality of binding soldering pads arranged along the second direction. Each of the plurality of binding soldering pads includes a first section forming an angle $\alpha 1$ with respect to the first direction, a second section forming an angle $\alpha 2$ with respect to the first direction, and a third section disposed adjacent to the first edge and forming an angle $\alpha 3$ with respect to the first direction, where $0° \leq \alpha 1 < \alpha 2 < 90°$ and $0° \leq \alpha 3 < \alpha 2 < 90°$. The second section includes a first end connected to the first section and a second end connected to the third section. In the first sub-area, the second end of the second section is closer to the third edge than the first end of the second section. In the second sub-area, the second end of the second section is closer to the fourth edge than the first end of the second section.

Other aspects of the present disclosure can be understood by those skilled in the art in light of the description, the claims, and the drawings of the present disclosure.

BRIEF DESCRIPTION OF THE DRAWINGS

To more clearly illustrate the technical solution in the present disclosure, the accompanying drawings used in the description of the disclosed embodiments are briefly described hereinafter. Obviously, the drawings described below are merely some embodiments of the present disclosure. Other drawings may be derived from such drawings by a person with ordinary skill in the art without creative efforts.

DETAILED DESCRIPTION

Figure 1:
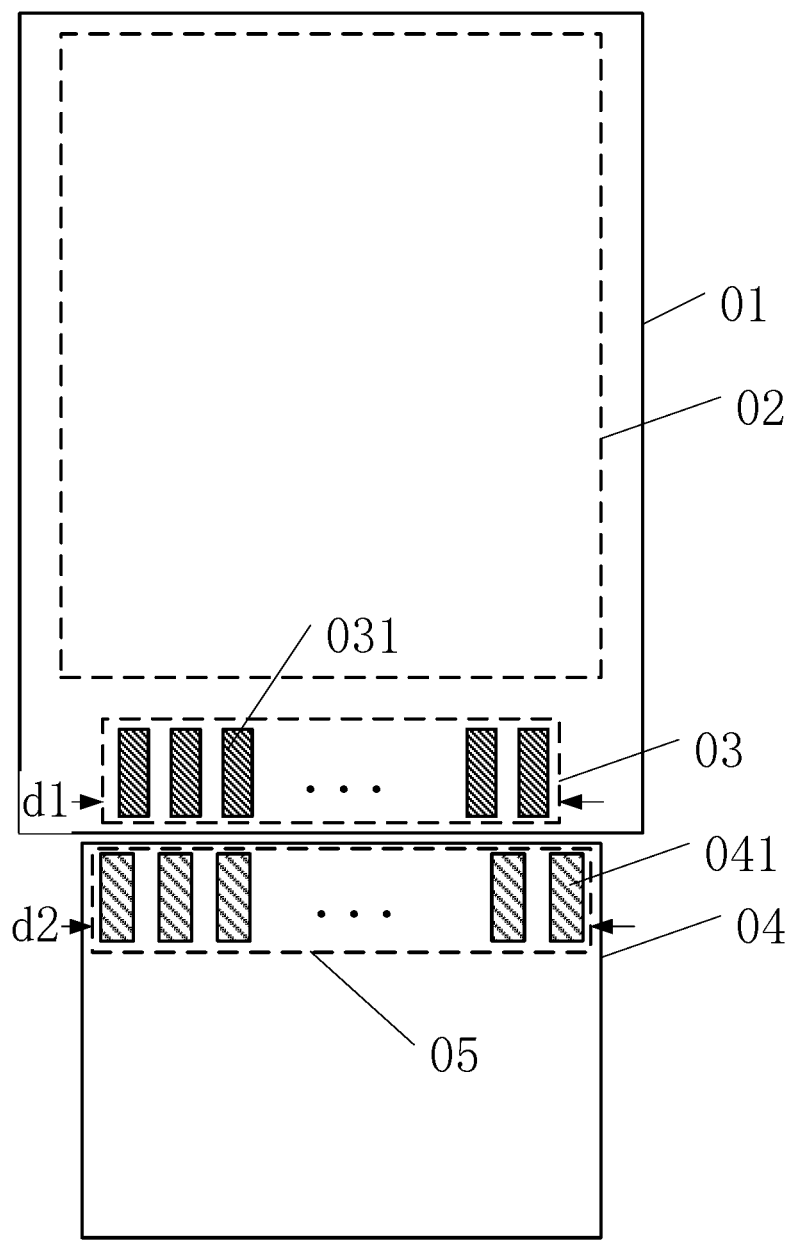
FIG. 1 illustrates a schematic view of a display apparatus.

To make the foregoing objectives, features and advantages of the present disclosure clearer and more understandable, the present disclosure will be further described with reference to the accompanying drawings and embodiments. However, exemplary embodiments may be embodied in various forms and should not be construed as limited to the embodiments set forth herein. The same reference labels and numerals in the drawings denote the same or similar structures and will not be described repetitively. The words and expressions of the positions and directions in the description of the present disclosure are illustrative with the pertaining drawings. However, changes may be made if necessary, and all the changes should be included in the scope of protection of the present disclosure. The drawings of the present disclosure are intended only to illustrate relative position relationship. Thicknesses of layers of certain parts may be enlarged for the convenience of comprehension and may not represent the proportional relationship of the thicknesses of the actual layers.

It should be noted that the specific details set forth in the following description are intended for those skilled in the art to fully understand the present disclosure. However, the present disclosure may be embodied in various other forms. Those skilled in the art may derive other embodiments without departing from the spirit of the present disclosure. Thus, the present disclosure should not be limited to the disclosed embodiments. When certain terms are used to denote certain structures in the specification and the claims, those skilled in the art should understand that hardware manufacturers may use different terms to refer to the same structures. The specification and the claims may not differentiate the structures according to the terminology difference, but rather, according to the functionality difference. When the specification and the claims use the word "comprising" as an open-ended term, it should be interpreted as "including but not limited to". The following specification describes various preferred embodiments of the present disclosure. However, such description is intended to illustrate the general principles of the present disclosure and is not intended to limit the scope of the present disclosure.

In a display apparatus manufactured by a chip-on-film (COF) process, misalignment often occurs between a flexible circuit board and a display panel, resulting in electronical connection failures between the flexible circuit board and the display panel.

FIG. 1 illustrates a schematic view of a display apparatus. The display apparatus may include a display panel 01 and a flexible circuit board 04. The display panel 01 may include a display area 02 and a binding area 03. The binding area 03 may include a plurality of soldering pads 031. The flexible circuit board 04 may include a gold finger area 05. The gold finger area 05 may include a plurality of gold fingers 041. In ideal circumstances, the binding area 03 may have a width same as a width of the gold finger area 05, and each of the plurality of the gold fingers 041 may be electrically connected to a corresponding soldering pad 031.

However, in practical applications, the display panel may have an expansion coefficient smaller that an expansion coefficient of the flexible circuit board, and the expansion coefficient of the flexible circuit board may fluctuate to certain extents. Under certain temperature circumstances, the width d2 of the gold finger area 05 may be greater than the width d1 of the binding area 03, causing misalignments between the plurality of gold fingers 041 and the plurality of soldering pads 031. In addition, the further away from the center of the binding area 03, the greater the misalignments between the gold fingers 041 and the soldering pads 031. Thus, when moving away from the center of the binding area 03, an effective binding area between each gold finger 041 and a corresponding soldering pad 031 may be reduced, the electrical connections between the flexible circuit 04 and the display panel 01 may fail, and the reliability and production yield of the display apparatuses may degrade.

In view of this, the present disclosure provides a display panel and a display apparatus to solve the problem of failed electrical connections between the flexible circuit board and the display panel and to improve the reliability of the display panel and the display apparatus. Various embodiments of the display panel and the display apparatus according to the present disclosure will be described in detail as follows.

Figure 2:
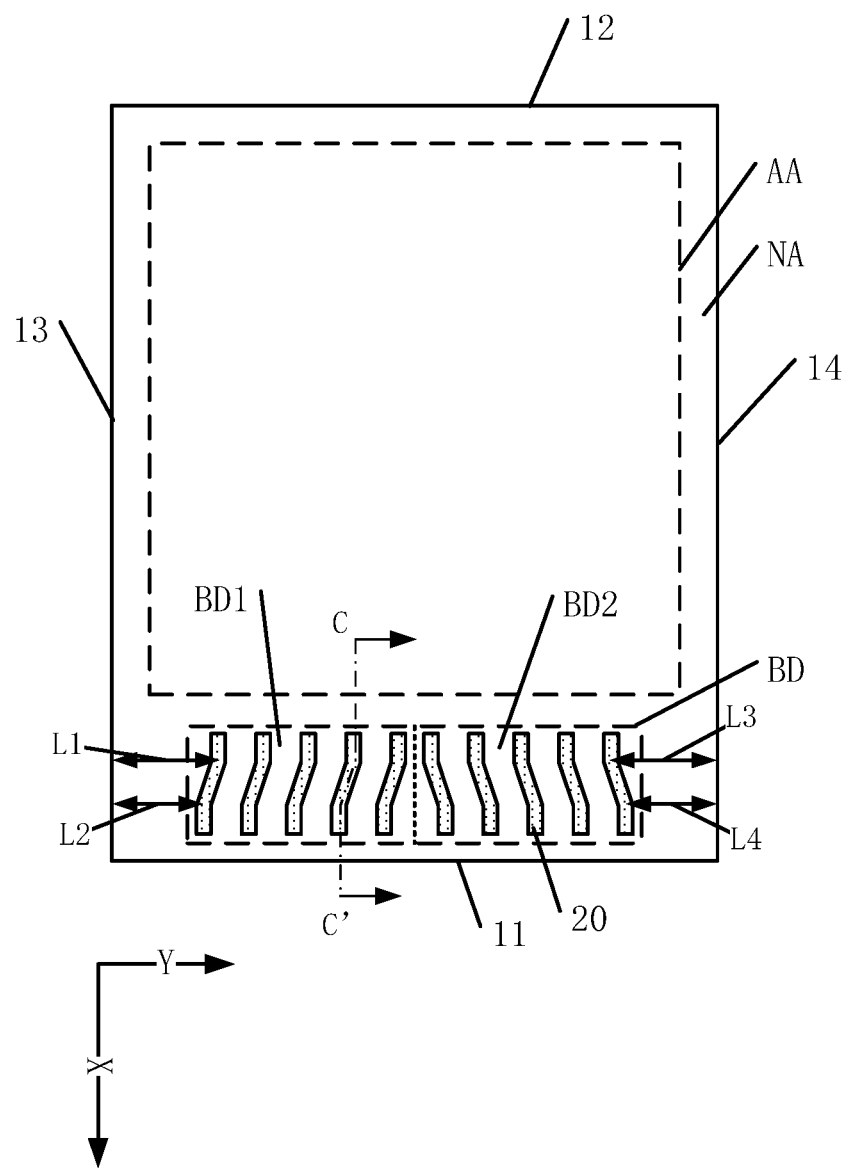
FIG. 2 illustrates a schematic view of an exemplary display panel according to disclosed embodiments of the present disclosure.
Figure 3:
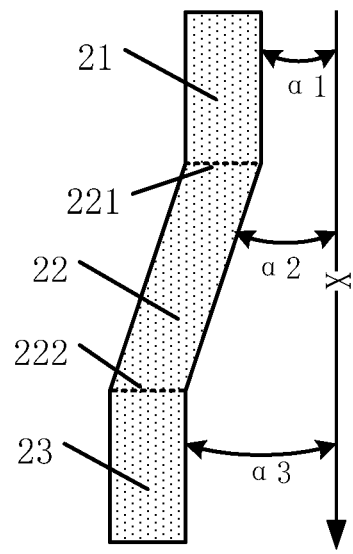
FIG. 3 illustrates a schematic view of an exemplary binding soldering pad in a first sub-area according to disclosed embodiments of the present disclosure.
Figure 4:
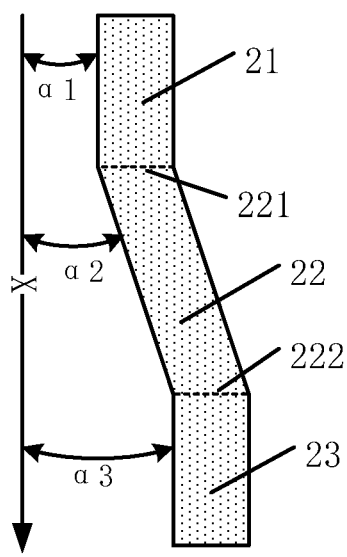
FIG. 4 illustrates a schematic view of an exemplary binding soldering pad in a second sub-area according to disclosed embodiments of the present disclosure.
Figure 5:
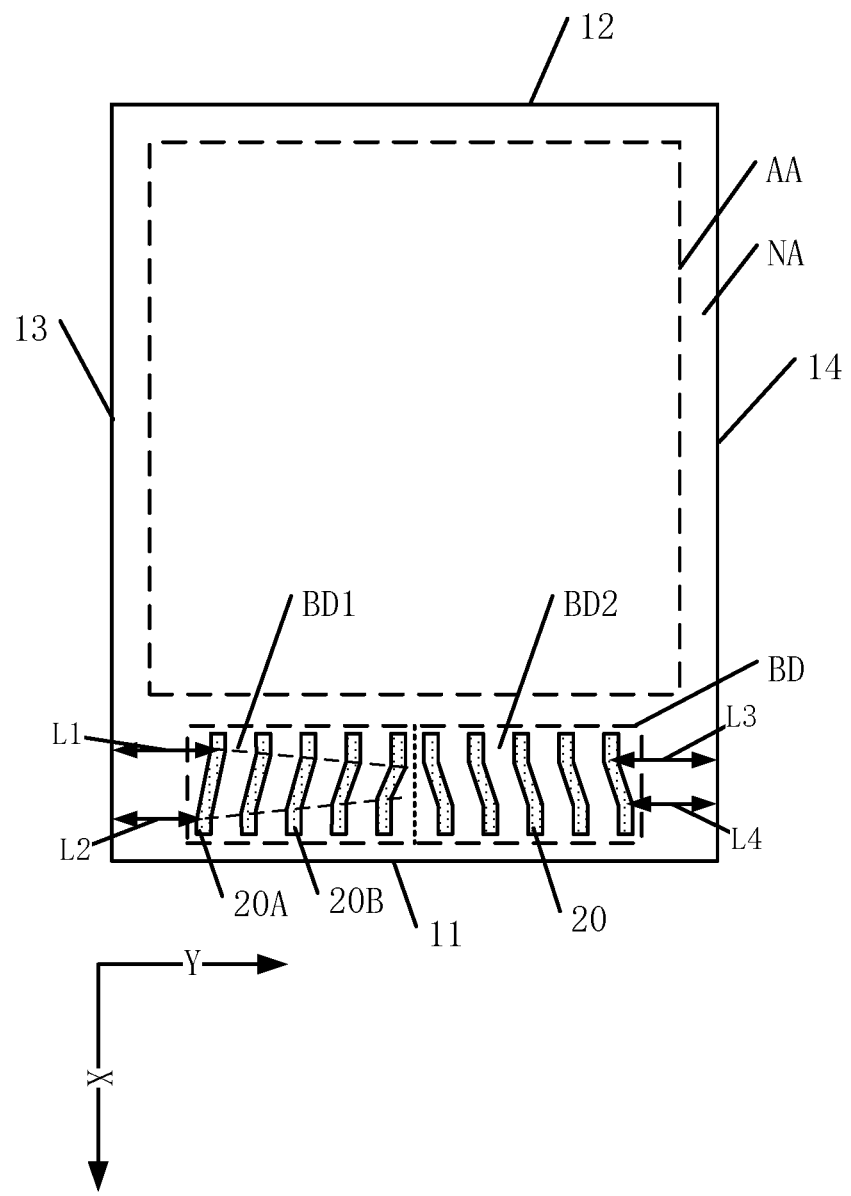
FIG. 5 illustrates a schematic view of another exemplary display panel according to disclosed embodiments of the present disclosure.

FIG. 2 illustrates a schematic view of an exemplary display panel according to disclosed embodiments of the present disclosure. FIG. 3 illustrates a schematic view of an exemplary binding soldering pad in a first sub-area according to disclosed embodiments of the present disclosure. FIG. 4 illustrates a schematic view of an exemplary binding soldering pad in a second sub-area according to disclosed embodiments of the present disclosure. FIG. 5 illustrates a schematic view of another exemplary display panel according to disclosed embodiments of the present disclosure.

The present disclosure provides a display panel. As shown in FIG. 2, the display panel may include a first edge 11 and a second edge 12, which are configured along a first direction X and facing opposite to each other, a third edge 13 and a fourth edge 14, which are configured along a second direction Y and facing opposite to each other, and a display area AA and a non-display area NA surrounding the display area AA. The non-display area NA may include a binding area BD. The binding area BD may be disposed in the non-display area NA adjacent to the first edge 11. The binding area BD may include a plurality of binding soldering pads 20 arranged along the second direction Y.

As shown in FIG. 3 and FIG. 4, each of the plurality of binding soldering pads 20 may include a first section 21, a second section 22, and a third section 23. A first end 221 of the second section 22 may be connected to the first section 21. A second end 222 of the second section 22 may be connected to the third section 23. The third section 23 may be disposed on a side of the first section 21 adjacent to the first edge 11.

In any of the plurality of the binding soldering pads 20, a first section 21 may form an angle α1 with respect to the first direction X, a second section 22 may form an angle α2 with respect to the first direction X, and a third section 23 may form an angle α3 with respect to the first direction X, where 0°≤α1<α2<90° and 0°≤α3<α2<90°.

As shown in FIG. 5, the binding area BD may include a first sub-area BD1 and a second sub-area BD2. The first sub-area BD1 may be disposed on a side of the second sub-area BD2 adjacent to the third edge 13. Both the first sub-area BD1 and the second sub-area BD2 may include a plurality of binding soldering pads 20, respectively.

In the first sub-area BD1, a distance L1 between the first end 221 of the second section 22 and the third edge 13 may be greater than a distance L2 between the second end 222 of the second section 22 and the third edge 13.

In the second sub-area BD2, a distance L3 between the first end 221 of the second section 22 and the fourth edge 14 may be greater than a distance L4 between the second end 222 of the second section 22 and the fourth edge 14.

In the present disclosure, the display panel may include the display area AA and the non-display area NA. The display area AA may have a function of displaying images and may be configured with a plurality of pixels (not shown). The non-display area NA may not have a function of displaying images and may be configured with wirings, circuits, electronic components, and other structures.

The non-display area NA may include the binding area BD. The binding area BD may be configured with the plurality of binding soldering pads 20. Each of the plurality of binding soldering pads 20 may be conductive and may be electrically connected to wirings or circuits in the display panel. The binding area BD may be configured to bind to a flexible circuit board (not shown). The flexible circuit board may transfer electrical signals external to the display panel to the plurality of binding soldering pads 20. The plurality of binding soldering pads 20 may further transfer the electrical signals to the corresponding wirings or circuits.

In the display panel according to the present disclosure, a shape of each of the plurality of binding soldering pads 20 may be customarily designed. In particular, each of the plurality of binding soldering pads 20 may be in a bent shape including three sections as the first section 21, the second section 22 and the third section 23. In one embodiment, the three sections may be integrally formed with a same material. The first section 21 and the third section 23 may be disposed on both ends of the second section 22 along the first direction X. The first section 21 may be disposed on a side of the second section 22 adjacent to the display area AA. The first section 21 may be connected directly to wirings or circuits in the display panel. The third section 23 may be disposed on a side of the second section 22 adjacent to the first edge 11.

In any of the plurality of binding soldering pads 20, the first section 21 may form the angle α1 with respect to the first direction X, the second section 22 may form the angle α2 with respect to the first direction X, and the third section 23 may form the angle α3 with respect to the first direction X, where 0°≤α1<α2<90° and 0°≤α3<α2<90°. In other words, the first section 21 may extend in a direction closer to the first direction X than the second section 22, and the third section 23 may extend in a direction closer to the first direction X than the second section 22. That is, the second section 22 may form an angle with respect to the first direction X greater than angles formed by the first section 21 and the third section 23 with respect to the first direction X and the second section 22 may be tilted more than the first section 21 and the third section 23.

In one embodiment, the tilted design of the second section 22 may not require an extension of the binding area BD in the first direction X. Because the second section 22 is tilted, an area occupied by the second section 22 may extend in the second direction Y. In one embodiment, when the flexible circuit board is bound to the display panel and an area occupied by each of the plurality of gold fingers increases due to the expansion of the flexible circuit board, the area occupied by the second section 22 may extend in the second direction Y. Thus, displacement of each of the plurality of gold fingers may be tolerated and an area for binding each of the plurality of gold fingers to a corresponding binding soldering pad 20 may be increased.

It should be noted that any two of the plurality of binding soldering pads 20 may have identical or different angles between the first sections 21 and the first direction X, identical or different angles between the second sections 22 and the first direction X, and identical or different angles between the third sections 23 and the first direction X, which are not limited by the present disclosure.

Further, in one embodiment, the arrangement of the plurality of binding soldering pads 20 in the binding area BD may be customarily designed. In particular, the binding area BD may include the first sub-area BD1 and the second sub-area BD2, both of which may include a plurality of binding soldering pads 20, respectively. The first sub-area BD1 may be disposed adjacent to the third edge 13. The second sub-area BD2 may be disposed adjacent to the fourth edge 14. In the first sub-area BD1, a second end 222 of a binding soldering pad 20 may be closer to the third edge 13 than a first end 221 of the same binding soldering pad 20. In the second sub-area BD2, a second end 222 of a binding soldering pad 20 may be closer to the fourth edge 14 than a first end 221 of the same binding soldering pad 20. In this arrangement, a binding soldering pad 20 in the first sub-area BD1 and a counterpart binding soldering pad 20 in the second sub-area BD2 may form a chimney shape.

In one embodiment, when the flexible circuit board is bound to the display panel and an area occupied by each of the plurality of gold fingers increases due to the expansion of the flexible circuit board, a gold finger disposed closer to the center of the gold finger area 05 may be displaced less than another gold finger disposed closer to the periphery of the gold finger area 05. In one embodiment, the customarily designed arrangement of the plurality of binding soldering pads 20 in the binding area BD may tolerate the displacement in the gold finger area 05 of the flexible circuit board and may mitigate the misalignment between the flexible circuit board and the display panel.

In the display panel provided by the present disclosure, a shape of each of the plurality of binding soldering pads 20 and an arrangement of each of the plurality of binding soldering pads 20 in the binding area BD may be customarily designed. On one hand, the tilted design of the second section 22 of each of the plurality of binding soldering pads 20 may avoid extending the binding area BD in the first direction X or reducing the display area AA, thereby keeping the bezels of the display panel thin. On the other hand, when the flexible circuit board is bound to the display panel, the tilted design of the second section 22 of each of the plurality of binding soldering pads 20 may increase a contact area between each of the plurality of binding soldering pads 20 and each corresponding gold finger of the flexible circuit board in the second direction Y to mitigate the misalignment between each of the plurality of binding soldering pads 20 and each corresponding gold finger.

Further, when the expansion of the display panel and the flexible circuit board due to elevated temperature widens the gold finger area 05 of the flexible circuit board, the tilted design of the second section 22 of each of the plurality of binding soldering pads 20 may increase a contact area between each of the plurality of binding soldering pads 20 and each corresponding gold finger in the second direction Y. Thus, the reliability of the electrical connections between the display panel and the flexible circuit board may be improved, and a temperature change may have a less impact on the display panel and the flexible circuit board. Further, the binding area BD may be divided to include at least the first sub-area BD1 and the second sub-area BD2. In this arrangement, a binding soldering pad 20 in the first sub-area BD1 and a counterpart binding soldering pad 20 in the second sub-area BD2 may form a chimney shape. Thus, the displacement in the gold finger area 05 of the flexible circuit board due to a temperature change may be accommodated, the misalignment between the flexible circuit board and the display panel may be mitigated, and problem of failed electrical connections between the flexible circuit board and the display panel may be solved.

In one embodiment, the first sub-area BD1 and the second sub-area BD2 may include same or different number of binding soldering pads 20. The present disclosure does not provide any limitation. When the first sub-area BD1 and the second sub-area BD2 include a same or substantially same number of binding soldering pads 20, the mitigation of the misalignment between the display panel and the flexible circuit board may be more effective.

In some embodiments, referring to FIG. 2, a second section 22 of each of the plurality of binding soldering pads 20 may have a same length in the binding area BD. In the display panel provided by the present disclosure, a second section 22 of each of the plurality of binding soldering pads 20 may be configured to have a same length to simplify the design of the plurality of binding soldering pads 20, thereby reducing the production cost of the display panel.

In one embodiment, referring to FIG. 5, one binding soldering pad 20 in any two of the plurality of binding soldering pads 20 in the first sub-area BD1, that is closer to the third edge 13 has a second section 22 longer than a second section 22 of another binding soldering pad 20 in the any two of the plurality of binding soldering pads in the first sub-area BD1.

In the first sub-area BD1 of the display panel provided by the present disclosure, the closer a second section 22 of a binding soldering pad 20 is disposed to the third edge 13, the longer the same second section 22 is. For example, a binding soldering pad 20A and a binding soldering pad 20B may be disposed in the first sub-area BD1. The binding soldering pad 20A may be disposed closer to the third edge 13 than the binding soldering pad 20B. A second section 22 of the binding soldering pad 20A may be longer than a second section 22 of the binding soldering pad 20B.

When the flexible circuit board is bound to the display panel provided by the present disclosure and the gold finger area of the flexible circuit board widens due to thermal expansion of the flexible circuit board, the closer a gold finger is disposed to the center of the gold finger area 05, the less the same gold finger is displaced, and the further away a gold finger is disposed from the center of the gold finger area 05, the more the same gold finger is displaced. In the display panel provided by the present disclosure, to adapt to the deformation in the gold finger area 05, a binding soldering pad 20 disposed closer to the center of the binding area BD may be configured with a shorter second section 22 while a binding soldering pad 20 disposed closer to the periphery of the binding area BD (or the third edge 13) may be configured with a longer second section 22.

A longer second section 22 of a binding soldering pad 20 may increase a binding contact area between the binding soldering pad 20 and a corresponding gold finger of the flexible circuit board. When a gold finger in the periphery of the gold finger area is displaced more, the same gold finger may still be effectively electrically connected to a corresponding binding soldering pad 20. Thus, the misalignment between the display panel and the flexible circuit board may be further mitigated, and the problem of failed electrical connections between the display panel and the flexible circuit board may be solved.

Figure 6:
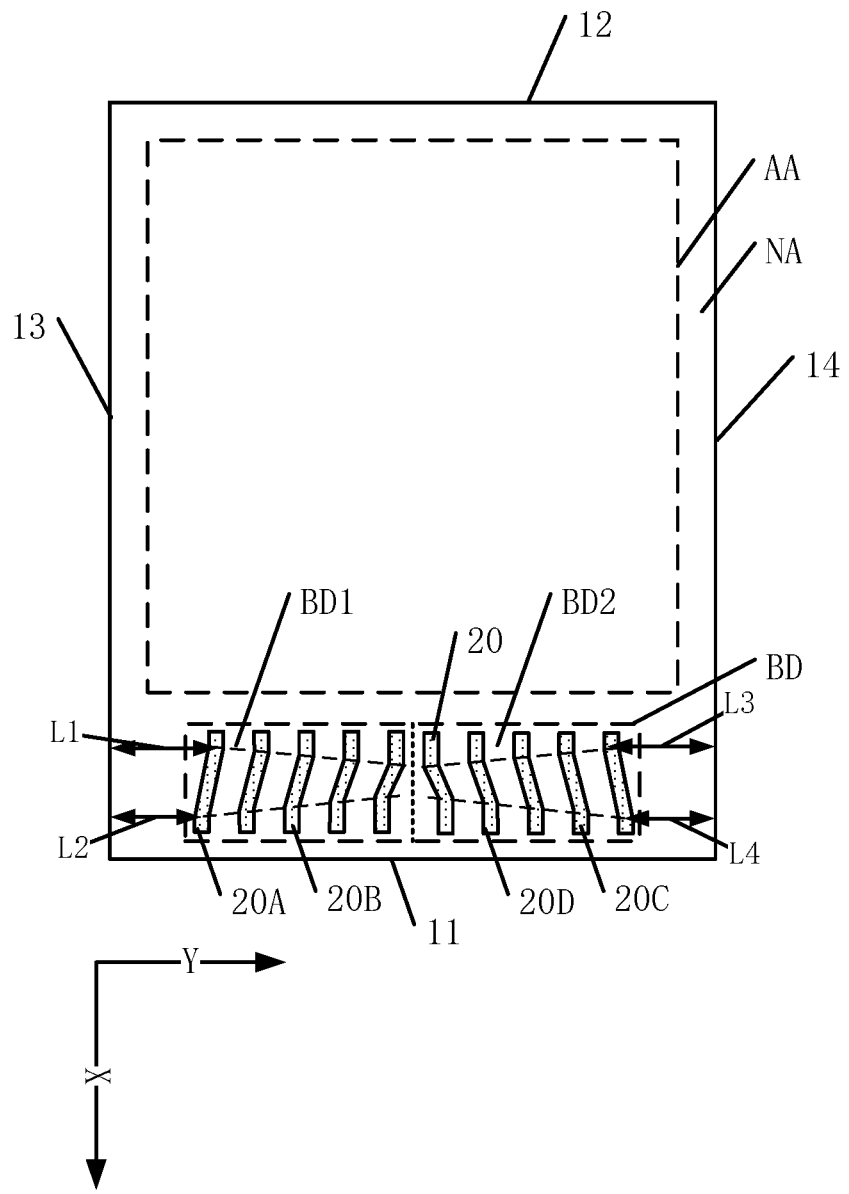
FIG. 6 illustrates a schematic view of another exemplary display panel according to disclosed embodiments of the present disclosure.

FIG. 6 illustrates a schematic view of another exemplary display panel according to disclosed embodiments of the present disclosure. In one embodiment, referring to FIG. 6, one binding soldering pad 20 in any two of the plurality of binding soldering pads 20 in the second sub-area BD2, that is closer to the fourth edge 14 has a second section 22 longer than a second section 22 of another binding soldering pad 20 in the any two of the plurality of binding soldering pads 20 in the second sub-area BD2.

In the second sub-area BD2 of the display panel provided by the present disclosure, the closer a second section 22 of a binding soldering pad 20 is disposed to the fourth edge 14, the longer the same second section 22 is. For example, a binding soldering pad 20C and a binding soldering pad 20D may be disposed in the second sub-area BD2. The binding soldering pad 20C may be disposed closer to the fourth edge 14 than the binding soldering pad 20D. A second section 22 of the binding soldering pad 20C may be longer than a second section 22 of the binding soldering pad 20D.

When the flexible circuit board is bound to the display panel provided by the present disclosure and the gold finger area of the flexible circuit board widens due to thermal expansion of the flexible circuit board, the closer a gold finger is disposed to the center of the gold finger area, the less the same gold finger is displaced, and the further away a gold finger is disposed from the center of the gold finger area, the more the same gold finger is displaced. In the display panel provided by the present disclosure, to adapt to the deformation in the gold finger area, a binding soldering pad 20 disposed closer to the center of the binding area BD may be configured with a shorter second section 22 while a binding soldering pad 20 disposed closer to the periphery of the binding area BD (or the fourth edge 14) may be configured with a longer second section 22.

A longer second section 22 of a binding soldering pad 20 may increase a binding contact area between the binding soldering pad 20 and a corresponding gold finger of the flexible circuit board. When a gold finger in the periphery of the gold finger area is displaced more, the same gold finger may still be effectively electrically connected to a corresponding binding soldering pad 20. Thus, the misalignment between the display panel and the flexible circuit board may be further mitigated, and the problem of failed electrical connections between the display panel and the flexible circuit board may be solved.

In one embodiment, referring to FIG. 2 through FIG. 4, a binding soldering pad 20 may include a first section 21 forming an angle $\alpha 1$ ($\alpha 1=0°$) with respect to the first direction X and a third section 23 forming an angle α3 (α3=0°) with respect to the first direction X.

In other words, in the display panel provided by the present disclosure, both the first section 21 and the third section 23 of the binding soldering pad 20 may extend in the first direction X. The first section 21 may be disposed adjacent to the display area AA. The first section 21 may be directly connected to wirings or circuits in the display panel. Extending the first section 21 in the first direction X may ensure a precise alignment between the binding soldering pad 20 and corresponding wirings or circuits in the display panel. Further, the same binding soldering pad 20 may be formed by two or more stacked conductive layers. Extending the first section 21 in the first direction X may increase the precision of aligning the two or more stacked conductive layers of the same binding soldering pad 20.

In another embodiment, referring to FIG. 2 through FIG. 4, a second section 22 of each of the plurality of binding soldering pads 20 in the binding area BD may form a same angle α2 with respect to the first direction X. The second section 22 of each of the plurality of binding soldering pad 20 may be tilted to the same extent. Thus, the design of the plurality of binding soldering pads 20 may be simplified, and the production cost of the display panel may be reduced.

In another embodiment, referring to FIG. 2 through FIG. 4, the second section 22 of each of the plurality of binding soldering pads 20 in the binding area BD may form the same angle α2 (0.06°≤α2≤15°) with respect to the first direction X. In practical applications, the angle between the second section 22 of each of the plurality of binding soldering pads 20 in the display panel provided by the present disclosure and the first direction X may be determined according to the actual requirements.

In some embodiments, the display panel and the flexible circuit board may have similar expansion coefficients. The display panel and the flexible circuit board may deform to similar extents. Correspondingly, the plurality of binding soldering pads 20 and the gold fingers may be displaced similarly. The second section 22 of each of the plurality of binding soldering pads 20 may be tilted slightly. For example, the angle α2 may be configured to be approximately 0.06° to satisfy the requirement of binding the display panel and the flexible circuit board.

In some other embodiments, the display panel and the flexible circuit board may have substantially different expansion coefficients. The display panel and the flexible circuit board may deform to substantially different extents. Correspondingly, the plurality of binding soldering pads 20 and the gold fingers may be displaced substantially differently. The second section 22 of each of the plurality of binding soldering pads 20 may be tilted substantially to increase a binding contact area between each of the plurality of binding soldering pads 20 and a corresponding gold finger of the flexible circuit board in the second direction Y. For example, the angle α2 may be configured to be approximately 15° to satisfy the requirement of binding the display panel and the flexible circuit board.

Figure 7:
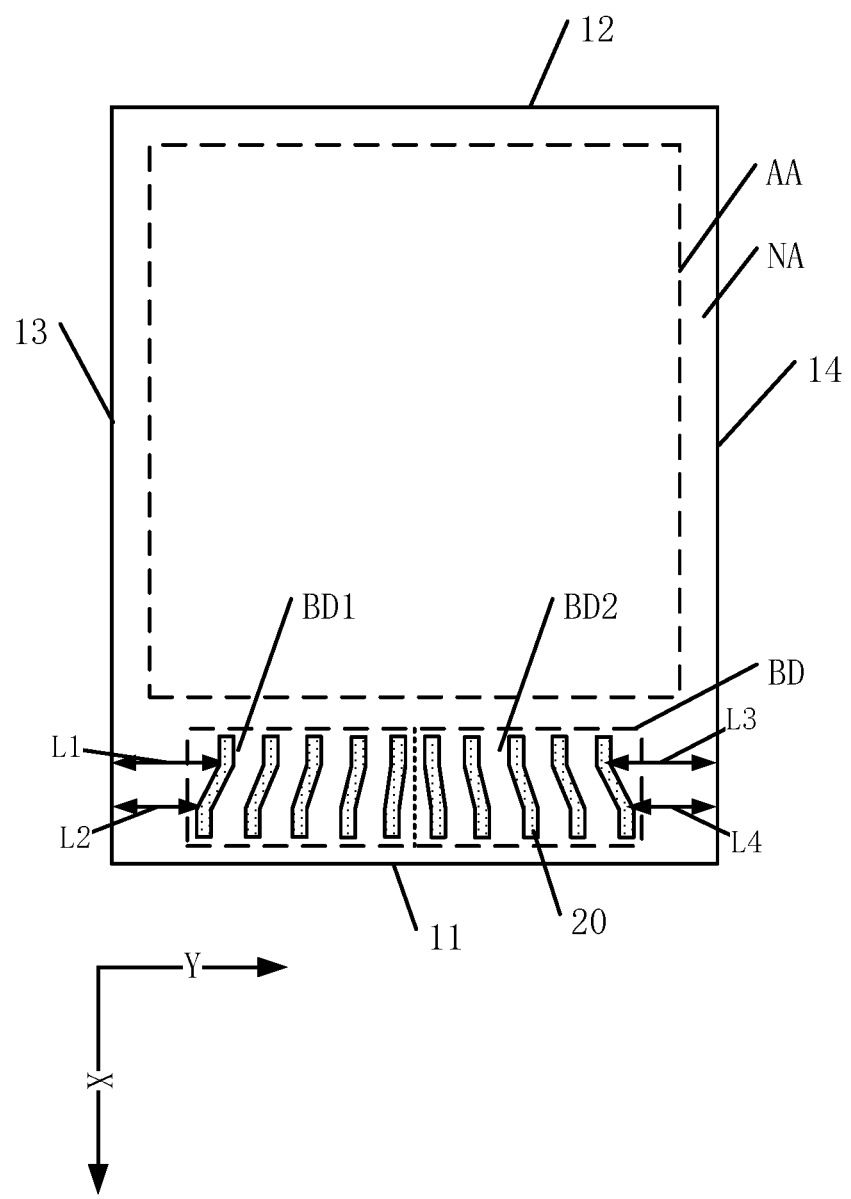
FIG. 7 illustrates a schematic view of another exemplary display panel according to disclosed embodiments of the present disclosure.
Figure 8:
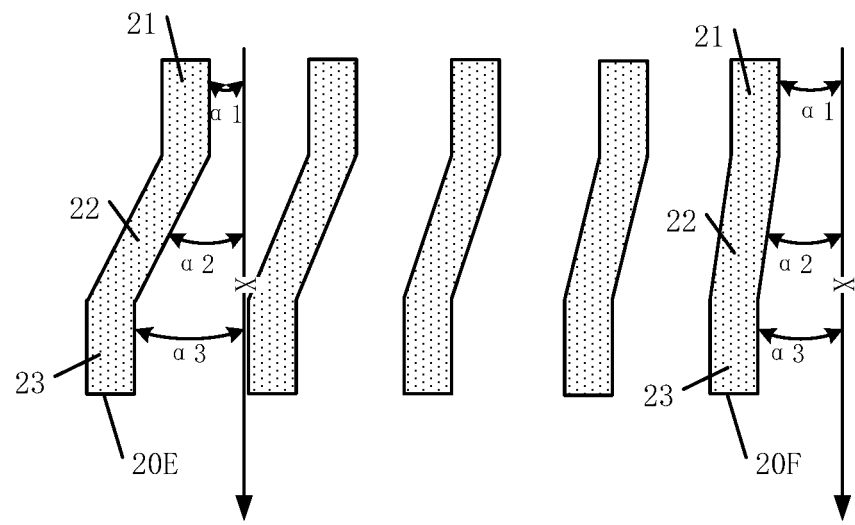
FIG. 8 illustrates a partially enlarged schematic view of a first sub-area in FIG. 7.
Figure 9:
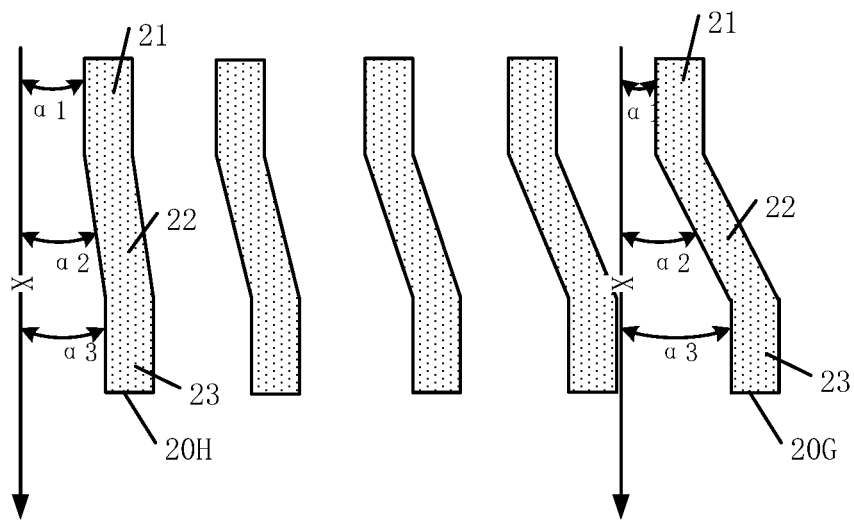
FIG. 9 illustrates a partially enlarged schematic view of a second sub-area in FIG. 7.

FIG. 7 illustrates a schematic view of another exemplary display panel according to disclosed embodiments of the present disclosure. FIG. 8 illustrates a partially enlarged schematic view of a first sub-area in FIG. 7. FIG. 9 illustrates a partially enlarged schematic view of a second sub-area in FIG. 7.

In one embodiment, referring to FIG. 7 through FIG. 9, one binding soldering pad 20 in any two of the plurality of binding soldering pads 20 in the first sub-area BD1, that is closer to the third edge 13 may form a larger angle α2 between the second section 22 and the first direction X than another binding soldering pad 20 in the any two of the plurality of binding soldering pads 20 in the first sub-area BD1. One binding soldering pad 20 in any two of the plurality of binding soldering pads 20 in the second sub-area BD2, that is closer to the fourth edge 14 may form a larger angle α2 between the second section 22 and the first direction X than another binding soldering pad 20 in the any two of the plurality of binding soldering pads 20 in the second sub-area BD2.

In the first sub-area BD1 of the display panel provided by the present disclosure, the closer a binding soldering pad 20 is disposed to the third edge 13, the larger an angle α2 is formed between a second section 22 of the binding soldering pad 20 and the first direction X. For example, referring to FIG. 7 and FIG. 8, a binding soldering pad 20E and a binding soldering pad 20F may be disposed in the first sub-area BD1. The binding soldering pad 20E may be disposed closer to the third edge 13 than the binding soldering pad 20F. An angle α2 formed between a second section 22 of the binding soldering pad 20E and the first direction X may be larger than an angle α2 formed between a second section 22 of the binding soldering pad 20F and the first direction X.

In the second sub-area BD2 of the display panel provided by the present disclosure, the closer a binding soldering pad 20 is disposed to the fourth edge 14, the larger an angle α2 is formed between a second section 22 of the binding soldering pad 20 and the first direction X. For example, referring to FIG. 7 and FIG. 9, a binding soldering pad 20G and a binding soldering pad 20H may be disposed in the second sub-area BD2. The binding soldering pad 20G may be disposed closer to the fourth edge 14 than the binding soldering pad 20H. An angle α2 formed between a second section 22 of the binding soldering pad 20G and the first direction X may be larger than an angle α2 formed between a second section 22 of the binding soldering pad 20H and the first direction X.

When the flexible circuit board is bound to the display panel provided by the present disclosure and the gold finger area of the flexible circuit board widens due to thermal expansion of the flexible circuit board, the closer a gold finger is disposed to the center of the gold finger area, the less the same gold finger is displaced, and the further away a gold finger is disposed from the center of the gold finger area, the more the same gold finger is displaced. In the display panel provided by the present disclosure, to adapt to the deformation in the gold finger area, a second section 22 of a binding soldering pad 20 disposed closer to the periphery of the display panel (e.g., the third edge 13 and the fourth edge 14) may be tilted more substantially. That is, the angle α2 formed between the second section 22 of the binding soldering pad 20 and the first direction X may be larger.

A larger angle α2 formed between a second section 22 of a binding soldering pad 20 may increase a binding contact area between the binding soldering pad 20 and a corresponding gold finger of the flexible circuit board in the second direction Y. When a gold finger in the periphery of the gold finger area is displaced more, the same gold finger may still be effectively electrically connected to a corresponding binding soldering pad 20. Thus, the misalignment between the display panel and the flexible circuit board may be further mitigated, and the problem of failed electrical connections between the display panel and the flexible circuit board may be solved.

Figure 10:
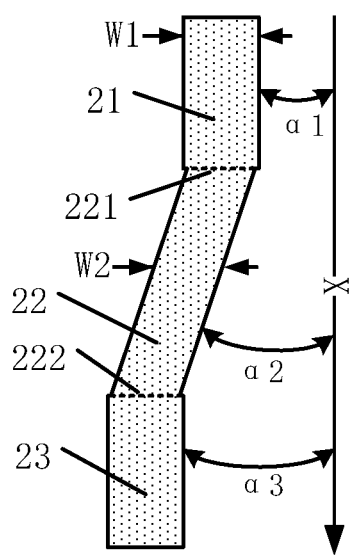
FIG. 10 illustrates a schematic view of another exemplary binding soldering pad according to disclosed embodiments of the present disclosure.

FIG. 10 illustrates a schematic view of another exemplary binding soldering pad according to disclosed embodiments of the present disclosure. In one embodiment, referring to FIG. 2 and FIG. 10, a binding soldering pad 20 may include a first section 21, a second section 22, and a third section 23. A width of the first section 21 may be W1 in the second direction Y. A width of the second section 22 may be W2 in the second direction Y, where W1>W2.

In the display panel provided by the present disclosure, a width of a second section 22 of a binding soldering pad 20 in the second direction Y may be smaller than a width of a first section 21 of the same binding soldering pad 20 in the second direction Y. Because the second section 22 is designed to be tilted, the binding area BD may be widened in the second direction Y. In one embodiment, to avoid an excessive widening of the binding area BD in the second direction Y to occupy too much space in the non-display area NA, the second section 22 may be configured to be narrower than the first section 21. Thus, the width of the binding area BD may be reduced in the second direction Y, the area occupied by the binding area BD may be reduced, and the bezels of the display panel may be kept thin.

Figure 11:
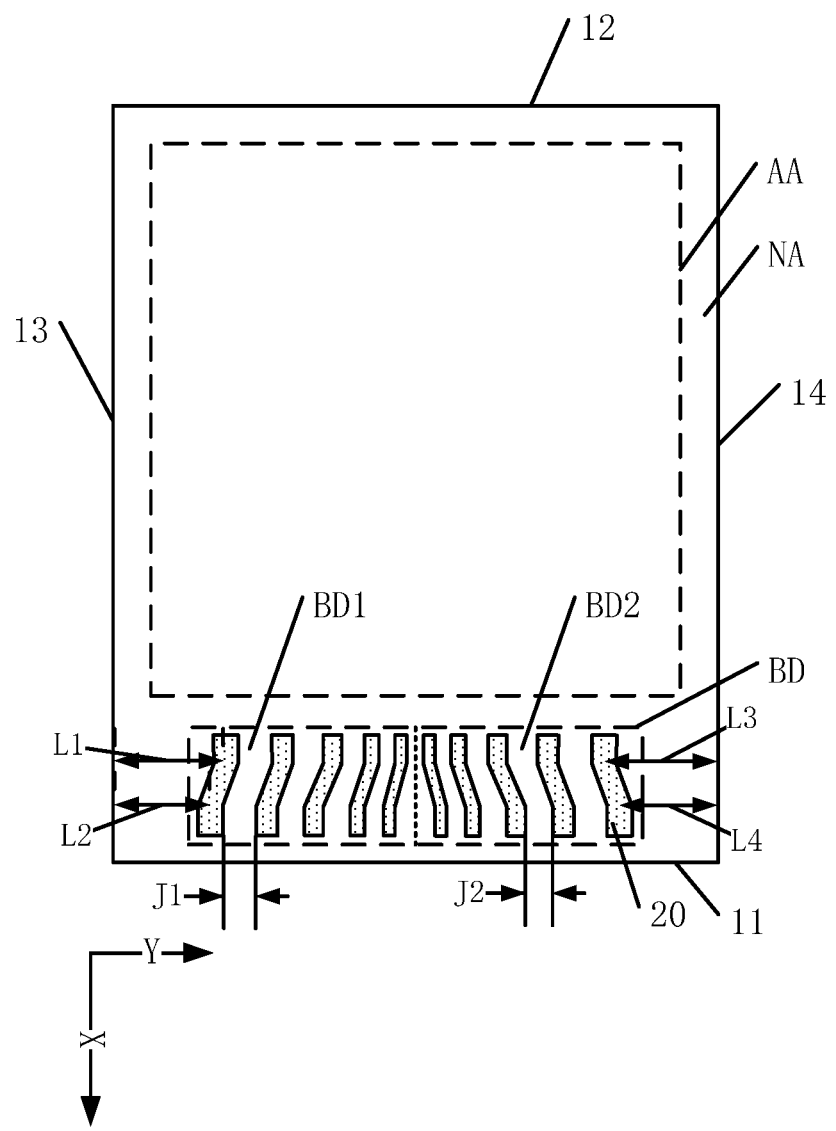
FIG. 11 illustrates a schematic view of another exemplary display panel according to disclosed embodiments of the present disclosure.

FIG. 11 illustrates a schematic view of another exemplary display panel according to disclosed embodiments of the present disclosure. In one embodiment, referring to FIG. 10 and FIG. 11, one binding soldering pad 20 in any two of the plurality of binding soldering pads 20 in the first sub-area BD1, that is closer to the third edge 13 may have a width greater than another binding soldering pad 20 in the any two of the plurality of soldering pads 20 in the first sub-area BD1 along the second direction Y. One binding soldering pad 20 in any two of the plurality of binding soldering pads 20 in the second sub-area BD2, that is closer to the fourth edge 14 may have a width greater than another binding soldering pad 20 in the any two of the plurality of binding soldering pads 20 in the second sub-area BD2 along the second direction Y.

In the display panel provided by the present disclosure, when comparing widths in the second direction Y between any two of the plurality of binding soldering pads 20 in the first sub-area BD1, same sections of the any two of the plurality of binding soldering pads 20 may be compared. For example, in any two of the plurality of binding soldering pads 20 in the first sub-area BD1, one binding soldering pad 20 that is closer to the third edge 13 may have a wider first section 21 in the second direction Y, a wider second section 22 in the second direction Y, and a wider third section 23 in the second direction Y.

Similarly, when comparing widths in the second direction Y between any two of the plurality of binding soldering pads 20 in the second sub-area BD2, same sections of the any two of the plurality of binding soldering pads 20 may be compared.

In one embodiment, for the plurality of binding soldering pads 20 in the first sub-area BD1, one binding soldering pad 20 that is closer to the third edge 13 may be wider. For the plurality of binding soldering pads 20 in the second sub-area BD2, one binding soldering pad 20 that is closer to the fourth edge 14 may be wider. A wider binding soldering pad 20 may increase a binding contact area between the binding soldering pad 20 and a corresponding gold finger of the flexible circuit board in the second direction Y. When a gold finger in the periphery of the gold finger area is displaced more, the same gold finger may still be effectively electrically connected to a corresponding binding soldering pad 20. Thus, the misalignment between the display panel and the flexible circuit board may be further mitigated, and the problem of failed electrical connections between the display panel and the flexible circuit board may be solved.

In one embodiment, referring to FIG. 11, adjacent binding soldering pads 20 in the first sub-area BD1 may be separated by a first distance J1. One first distance J1 in any two of the plurality of first distances J1, that is closer to the third edge 13 may have a width greater than another first distance J1 in the any two first distances J1 in the first sub-area BD1 along the second direction Y.

Similarly, adjacent binding soldering pads 20 in the second sub-area BD2 may be separated by a second distance J2. One second distance J2 in any two of the plurality of second distances J2, that is closer to the fourth edge 14 may have a width greater than another second distance J2 in the any two second distances in the second sub-area BD2 along the second direction Y.

In one embodiment, the closer a first distance J1 is disposed to the third edge 13 in the first sub-area BD1, the wider the first distance J1 becomes. Similarly, the closer a second distance J2 is disposed to the fourth edge 14 in the second sub-area BD2, the wider the second distance J2 becomes. A wider distance between adjacent binding soldering pads 20 may prevent a displaced gold finger from being electrically connected to an unintended binding soldering pad 20. When gold fingers in the gold finger area are displaced substantially, the display panel provided by the present disclosure may prevent a binding soldering pad 20 adjacent to the periphery of the display panel from being electrically connected to an unintended gold finger. Thus, the plurality of binding soldering pads 20 and the corresponding gold fingers may be bound precisely.

Figure 12:
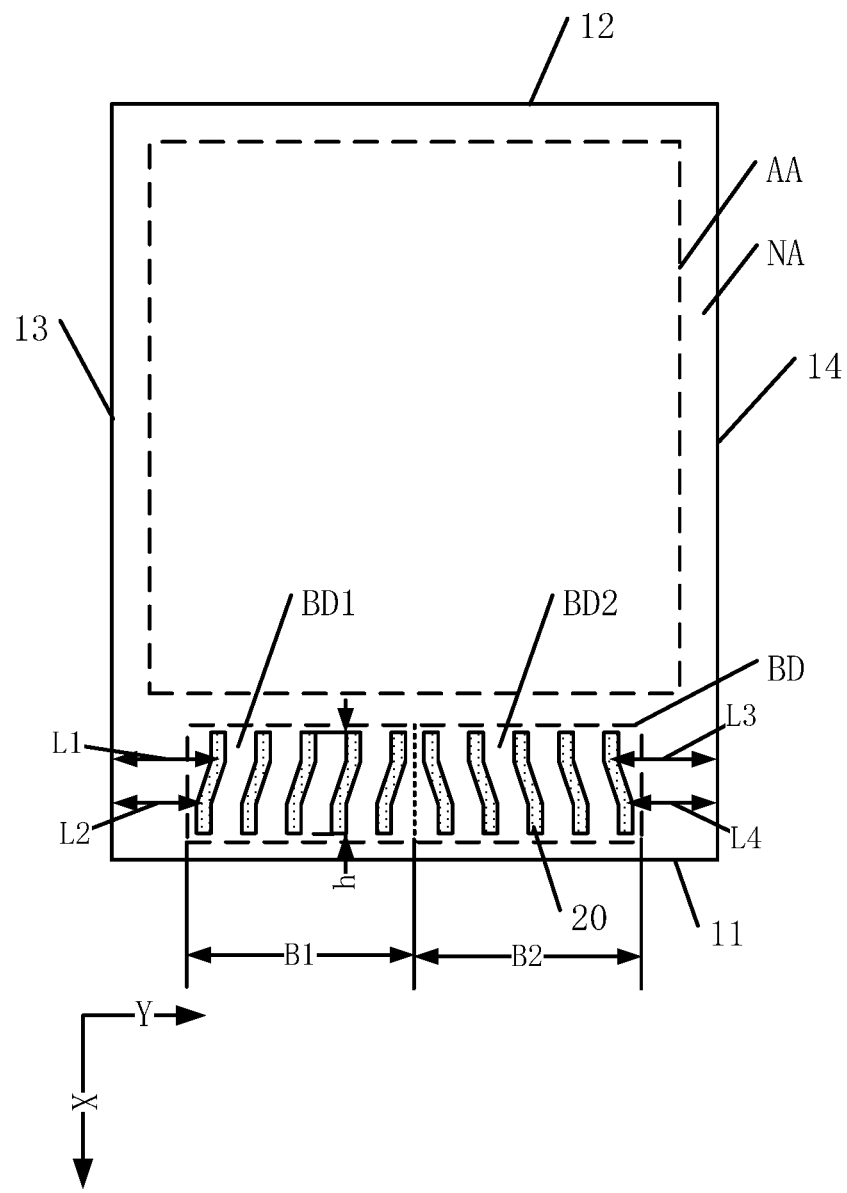
FIG. 12 illustrates a schematic view of another exemplary display panel according to disclosed embodiments of the present disclosure.

FIG. 12 illustrates a schematic view of another exemplary display panel according to disclosed embodiments of the present disclosure. In one embodiment, referring to FIG. 12, the first sub-area BD1 may have a width B1 in the second direction Y and the second sub-area BD2 may have a width B2 in the second direction Y, where B1=B2.

In the display panel provided by the present disclosure, the first sub-area BD1 and the second sub-area BD2 may be configured to have an equal width in the second direction Y. When the flexible circuit board is bound to the display panel provided by the present disclosure, the first sub-area BD1 and second sub-area BD2 having the equal width may adapt to deformation of the flexible circuit board.

In another embodiment, referring to FIG. 12, the first sub-area BD1 and the second sub-area BD2 may include an equal number of binding soldering pads 20. Each of the plurality of binding soldering pads 20 in the first sub-area BD1 may be arranged symmetrically with a corresponding binding soldering pad 20 in the second sub-area BD2 to adapt to deformation of the flexible circuit board.

In another embodiment, referring to FIG. 12, the plurality of binding soldering pads 20 may have a same height h in the first direction X. Configuring the plurality of binding soldering pads 20 to a uniform height h in the first direction X may simplify the design of the plurality of binding soldering pads 20 and reduce production cost of the display panel.

Figure 13:
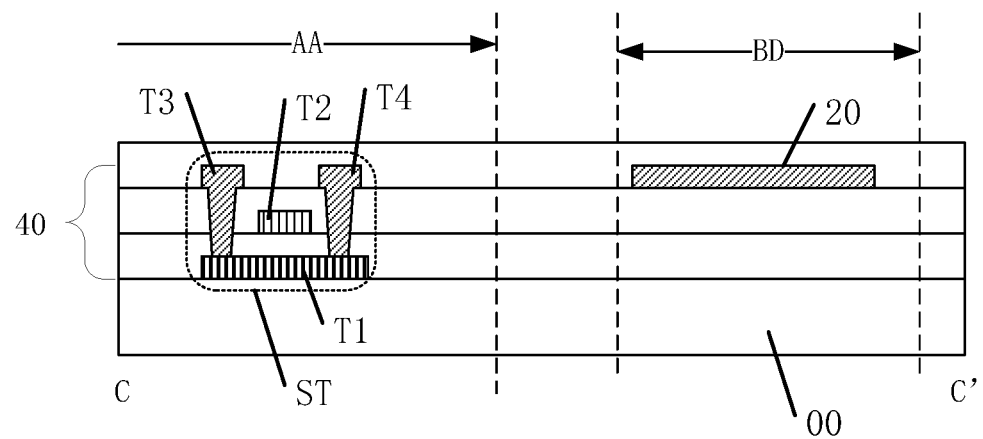
FIG. 13 illustrates a cross-sectional view along the CC' line in FIG. 2.

FIG. 13 illustrates a cross-sectional view along the CC' line in FIG. 2. In one embodiment, referring to FIG. 2 and FIG. 13, the display panel may further include a substrate 00 and an array layer 40 disposed on the substrate 00. The array layer 40 may include a plurality of thin-film transistors ST. A thin-film transistor ST may include a semiconductor portion T1, a gate electrode T2, a source electrode T3, and a drain electrode T4. The plurality of binding soldering pads 20, the source electrode T3, and the drain electrode T4 may be made of a same material and may be formed in a same layer.

In the display panel provided by the present disclosure, the substrate 00 may be rigid. For example, the substrate 00 may be made of glass. The substrate 00 may also be flexible. For example, the substrate 00 may be made of resin. The present disclosure does not provide any limitation.

The array layer 40 may be disposed on the substrate 00. The array layer 40 may include a plurality of thin-film transistors ST. The plurality of thin-film transistors ST may be disposed in the display area AA and the non-display area NA, respectively. Numbers of thin-film transistors ST may be determined according to actual requirements of the display panel. For illustrative purposes, only one thin-film transistor ST is shown in FIG. 13.

In one embodiment, referring to FIG. 13, the source electrode T3 and the drain electrode T4 of the thin-film transistor ST may be made of a metallic material with superior conductivity. The binding soldering pad 20, the source electrode T3, and the drain electrode T4 may be made of a same material and may be formed in a same layer. Thus, the fabrication process of the display panel may be simplified, and production cost of the display panel may be reduced.

To clearly illustrate film layer structures of the display panel provided by the present disclosure, only a part of the film layer structures of the display panel is shown in FIG. 13.

The present disclosure also provides a display apparatus, which includes the display panel provided by any of the previously described embodiments.

Figure 14:
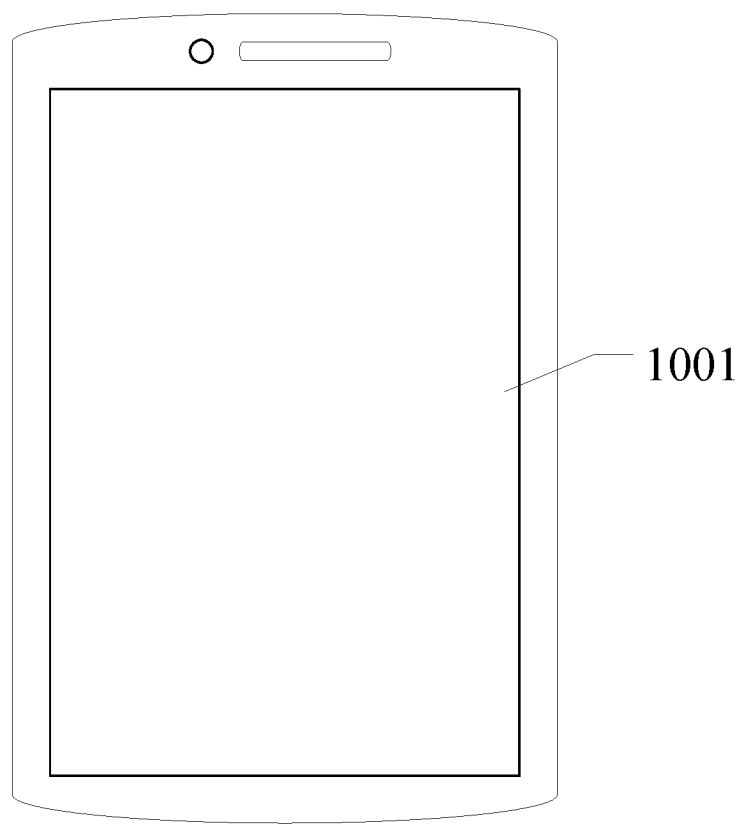
FIG. 14 illustrates a schematic view of an exemplary display apparatus according to disclosed embodiments of the present disclosure.

FIG. 14 illustrates a schematic view of an exemplary display apparatus according to disclosed embodiments of the present disclosure. As shown in FIG. 14, the display apparatus 1000 may include a display panel 1001 provided by any of the previously described embodiments. For illustrative purposes, a smart phone is shown in FIG. 14. The display apparatus 1000 provided by the present disclosure may be a computer, a television set, a vehicle-mounted display device, or other display devices having a display function. The present disclosure does not provide any limitation. The display apparatus provided by the present disclosure may include the beneficial effects of the display panel provided by the present disclosure. The detail description of the display apparatus may be referred to the description of the display panel and will not be repeated herein.

Figure 15:
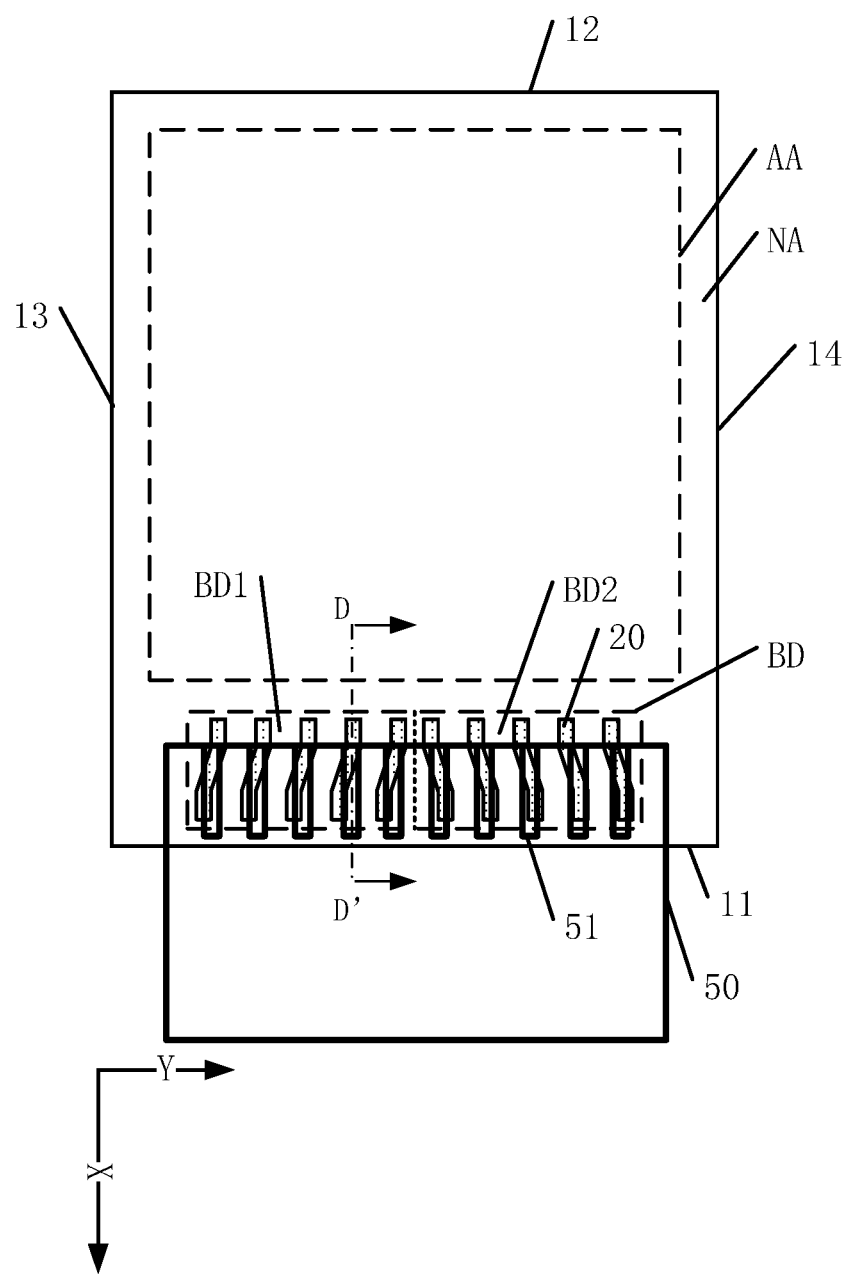
FIG. 15 illustrates a schematic view of another exemplary display apparatus according to disclosed embodiments of the present disclosure.
Figure 16:
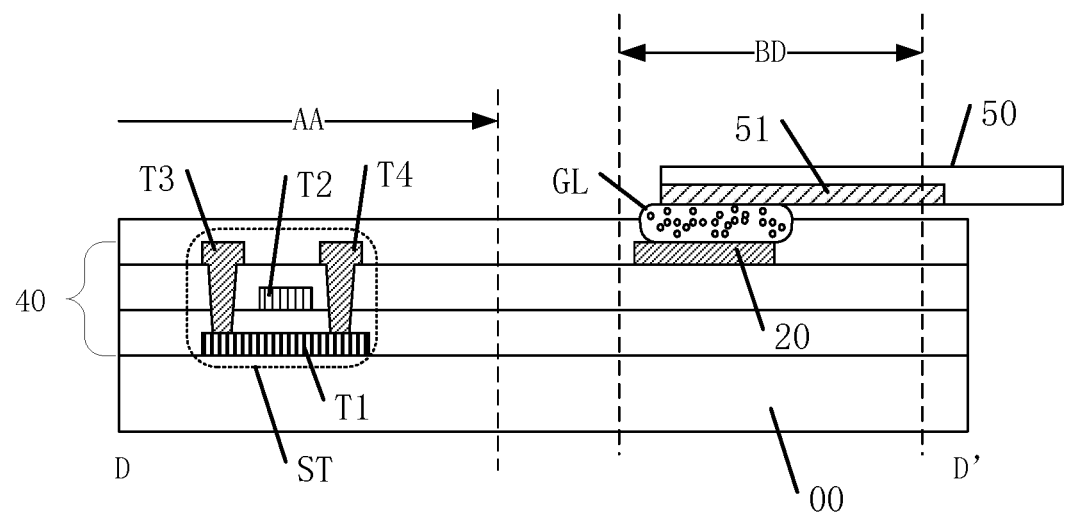
FIG. 16 illustrates a cross-sectional view along the DD' line in FIG. 15.

FIG. 15 illustrates a schematic view of another exemplary display apparatus according to disclosed embodiments of the present disclosure. FIG. 16 illustrates a cross-sectional view along the DD' line in FIG. 15. As shown in FIG. 15, the display apparatus may further include a flexible circuit board 50. The flexible circuit board 50 may include a plurality of gold fingers 51. The plurality of gold fingers 51 may be electrically connected to corresponding binding soldering pads 20 through a conductive paste GL.

In the display apparatus provided by the present disclosure, the flexible circuit board 50 may be bound to the display panel. The flexible circuit board 50 may include a plurality of gold fingers 51. The plurality of gold fingers 51 may be electrically connected to corresponding binding soldering pads 20 through the conductive paste GL. The flexible circuit board may be a printed circuit board made of a flexible insulative substrate (mainly polyimide or polyester film) that can be bent, wound, and folded freely. Using the flexible circuit board may substantially reduce a size of the display apparatus. Thus, the display apparatus may become highly compact, miniaturized, and highly reliable.

From the above embodiments, the display panel and the display apparatus provided by the present disclosure may provide at least the following beneficial effects.

In the display panel and the display apparatus provided by the present disclosure, the shape of each of the plurality of binding soldering pads and the arrangement of each of the plurality of binding soldering pads in the binding area may be customarily designed. On one hand, the tilted design of the second section of each of the plurality of binding soldering pads may avoid extending the binding area in the first direction or reducing the display area, thereby keeping the bezels of the display panel thin. On the other hand, when the flexible circuit board is bound to the display panel, the tilted design of the second section of each of the plurality of binding soldering pads may increase a contact area between each of the plurality of binding soldering pads and each corresponding gold finger of the flexible circuit board in the second direction to mitigate the misalignment between each of the plurality of binding soldering pads and each corresponding gold finger.

Further, when expansion of the display panel and the flexible circuit board due to elevated temperature widens the gold finger area of the flexible circuit board, the tilted design of the second section of each of the plurality of binding soldering pads may increase a contact area between each of the plurality of binding soldering pads and each corresponding gold finger in the second direction. Thus, the reliability of the electrical connections between the display panel and the flexible circuit board may be improved, and a temperature change may have a less impact on the display panel and the flexible circuit board. Further, the binding area may be divided to include at least the first sub-area and the second sub-area. In this arrangement, a binding soldering pad in the first sub-area and a counterpart binding soldering pad in the second sub-area may form a chimney shape. Thus, the displacement in the gold finger area of the flexible circuit board due to a temperature change may be accommodated, the misalignment between the flexible circuit board and the display panel may be mitigated, and problem of failed electrical connections between the flexible circuit board and the display panel may be solved.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above described embodiments, the present disclosure is not limited to the above described embodiments but may be embodied in other equivalent forms without departing from the scope of the present disclosure, which is determined by the appended claims.

What is claimed is:

1. A display panel, comprising:
 a first edge and a second edge, configured along a first direction and facing opposite to each other;
 a third edge and a fourth edge, configured along a second direction and facing opposite to each other;
 a display area; and
 a non-display area surrounding the display area and including a binding area disposed adjacent to the first edge,
 wherein:
 the binding area includes a first sub-area adjacent to the third edge and a second sub-area adjacent to the fourth edge, each of the first and second sub-areas including a plurality of binding soldering pads arranged along the second direction;

each of the plurality of binding soldering pads includes a first section forming an angle α1 with respect to the first direction, a second section forming an angle α2 with respect to the first direction, and a third section disposed adjacent to the first edge and forming an angle α3 with respect to the first direction, where 0°≤α1<α2<90° and 0°≤α3<α2<90°;

the second section includes a first end connected to the first section and a second end connected to the third section, and the first section is electrically connected to wirings of the display panel;

in the first sub-area, the second end of the second section is closer to the third edge than the first end of the second section;

in the second sub-area, the second end of the second section is closer to the fourth edge than the first end of the second section;

the first section has a width W1 in the second direction, the second section connecting the first section and the third section has a width W2 in the second direction, and W1>W2, such that the second section is tilted with respect to the first section and a width of the binding area in the second direction is reduced, wherein the plurality of binding soldering pads are arranged to bind a plurality of gold fingers of a flexible circuit board over the plurality of binding soldering pads, such that the tilted sections of the plurality of binding soldering pads increases a contact area between each of the plurality of binding soldering pads and each corresponding gold finger of the flexible circuit board in the second direction to mitigate the misalignment between each of the plurality of binding soldering pads and each corresponding gold finger of the flexible circuit, and wherein each gold finger of the flexible circuit contacts both the second section and the third section a corresponding binding soldering pad.

2. The display panel according to claim 1, wherein:
one binding soldering pad, in any two of the plurality of binding soldering pads in the first sub-area, that is closer to the third edge has a second section longer than a second section of another binding soldering pad in the any two of the plurality of binding soldering pads in the first sub-area.

3. The display panel according to claim 1, wherein:
one binding soldering pad, in any two of the plurality of binding soldering pads in the second sub-area, that is closer to the fourth edge has a second section longer than a second section of another binding soldering pad in the any two of the plurality of binding soldering pads in the second sub-area.

4. The display panel according to claim 1, wherein:
in the binding area, each of the plurality of binding soldering pads has a same length second section.

5. The display panel according to claim 1, wherein:
in the binding area, a second section of each of the plurality of binding soldering pads forms a same angle α2 with respect to the first direction.

6. The display panel according to claim 1, wherein:
a1=0° and a3=0°.

7. The display panel according to claim 1, wherein:
0.06°≤a2≤15°.

8. The display panel according to claim 1, wherein:
one binding soldering pad, in any two of the plurality of binding soldering pads in the first sub-area, that is closer to the third edge has a larger angle α2 than another binding soldering pad in the any two of the plurality of binding soldering pads in the first sub-area; and one binding soldering pad, in any two of the plurality of binding soldering pads in the second sub-area, that is closer to the fourth edge has a larger angle α2 than another binding soldering pad in the any two of the plurality of binding soldering pads in the second sub-area.

9. The display panel according to claim 1, wherein:
one binding soldering pad, in any two of the plurality of binding soldering pads in the first sub-area, that is closer to the third edge has a width greater than another binding soldering pad in the any two of the plurality of binding soldering pads in the first sub-area along the second direction; and one binding soldering pad, in any two of the plurality of binding soldering pads in the second sub-area, that is closer to the fourth edge has a width greater than another binding soldering pad in the any two of the plurality of binding soldering pads in the second sub-area along the second direction.

10. The display panel according to claim 1, wherein:
in the first sub-area, adjacent binding soldering pads of the plurality of binding soldering pads are separated by a first distance;

one first distance in any two first distances, that is closer to the third edge has a width greater than another first distance in the any two first distances in the first sub-area along the second direction;

in the second sub-area, adjacent binding soldering pads of the plurality of binding soldering pads are separated by a second distance; and one second distance in any two second distances, that is closer to the fourth edge has a width greater than another second distance in the any two second distances in the second sub-area along the second direction.

11. The display panel according to claim 1, wherein:
the first sub-area has a width B1 in the second direction, the second sub-area has a width B2 in the second direction, and B1=B2.

12. The display panel according to claim 11, wherein:
the first sub-area and the second sub-area include an equal number of binding soldering pads.

13. The display panel according to claim 1, wherein:
the plurality of binding soldering pads has a same height in the first direction.

14. The display panel according to claim 1, further including:
a substrate; and
an array layer disposed on the substrate and including a plurality of thin-film transistors,
wherein:
each of the plurality of thin-film transistors includes a semiconductor portion, a gate electrode, a source electrode, and a drain electrode; and
the plurality of binding soldering pads, the source electrode and the drain electrode are made of a same material and are formed in a same layer.

15. The display panel according to claim 1, wherein:
the plurality of binding soldering pads are electrically connected to the plurality of gold fingers of the flexible circuit board through a conductive paste, respectively; and
a binding soldering pad in the first sub-area and a counterpart binding soldering pad in the second sub-area form a chimney shape with a narrower opening adjacent to the display area and a wider opening adjacent to the first edge, such that the contact area between each of the plurality of binding soldering pads and each corresponding gold finger of the flexible circuit board in the second direction increases without extending the binding area in the first direction as displacement of the plurality of gold fingers increases due to thermal expansion from the center of the first edge to either the third edge or the fourth edge.

16. The display panel according to claim 1, wherein:
the second section connects the first section and the third section, the third section has a width W3 in the second direction, and W3>W2.

17. A display apparatus, comprising:
a display panel, including:
a first edge and a second edge, configured along a first direction and facing opposite to each other;
a third edge and a fourth edge, configured along a second direction and facing opposite to each other;
a display area; and
a non-display area surrounding the display area and including a binding area disposed adjacent to the first edge,
wherein:
the binding area includes a first sub-area adjacent to the third edge and a second sub-area adjacent to the fourth edge, each of the first and second sub-areas including a plurality of binding soldering pads arranged along the second direction;
each of the plurality of binding soldering pads includes a first section forming an angle α1 with respect to the first direction, a second section forming an angle α2 with respect to the first direction, and a third section disposed adjacent to the first edge and forming an angle α3 with respect to the first direction, where 0°≤α1<α2<90° and 0°≤α3<α2<90°;
the second section includes a first end connected to the first section and a second end connected to the third section, and the first section is electrically connected to wirings of the display panel;
in the first sub-area, the second end of the second section is closer to the third edge than the first end of the second section;
in the second sub-area, the second end of the second section is closer to the fourth edge than the first end of the second section;
the first section has a width W1 in the second direction, the second section connecting the first section and the third section has a width W2 in the second direction, and W1>W2, such that the second section is tilted with respect to the first section and a width of the binding area in the second direction is reduced,
wherein the display apparatus further includes a flexible circuit board; and the plurality of binding soldering pads are arranged to bind a plurality of gold fingers of a flexible circuit board over the plurality of binding soldering pads, such that the tilted sections of the plurality of binding soldering pads increases a contact area between each of the plurality of binding soldering pads and each corresponding gold finger of the flexible circuit board in the second direction to mitigate the misalignment between each of the plurality of binding soldering pads and each corresponding gold finger of the flexible circuit, and
wherein each gold finger of the flexible circuit contacts both the second section and the third section a corresponding binding soldering pad.

18. The display apparatus according to claim 17, wherein:
one binding soldering pad, in any two of the plurality of binding soldering pads in the first sub-area, that is closer to the third edge has a larger angle α2 than another binding soldering pad in the any two of the plurality of binding soldering pads in the first sub-area; and
one binding soldering pad, in any two of the plurality of binding soldering pads in the second sub-area, that is closer to the fourth edge has a larger angle α2 than another binding soldering pad in the any two of the plurality of binding soldering pads in the second sub-area.

19. The display apparatus according to claim 17, wherein:
one binding soldering pad, in any two of the plurality of binding soldering pads in the first sub-area, that is closer to the third edge has a width greater than another binding soldering pad in the any two of the plurality of binding soldering pads in the first sub-area along the second direction; and
one binding soldering pad, in any two of the plurality of binding soldering pads in the second sub-area, that is closer to the fourth edge has a width greater than another binding soldering pad in the any two of the plurality of binding soldering pads in the second sub-area along the second direction.

20. The display apparatus according to claim 17, wherein:
in the first sub-area, adjacent binding soldering pads of the plurality of binding soldering pads are separated by a first distance;
one first distance in any two first distances, that is closer to the third edge has a width greater than another first distance in the any two first distances in the first sub-area along the second direction;
in the second sub-area, adjacent binding soldering pads of the plurality of binding soldering pads are separated by a second distance; and
one second distance in any two second distances, that is closer to the fourth edge has a width greater than another second distance in the any two second distances in the second sub-area along the second direction.

* * * * *